E. R. CASE.
PORTABLE COLLAPSIBLE COLLECTING CONTRIVANCE.
APPLICATION FILED DEC. 21, 1917.

1,368,697.

Patented Feb. 15, 1921.
2 SHEETS—SHEET 1.

Inventor.
E. R. Case

E. R. CASE.
PORTABLE COLLAPSIBLE COLLECTING CONTRIVANCE.
APPLICATION FILED DEC. 21, 1917.

1,368,697.

Patented Feb. 15, 1921.
2 SHEETS—SHEET 2.

Inventor
E. R. Case

UNITED STATES PATENT OFFICE.

EGERTON RYERSON CASE, OF TORONTO, ONTARIO, CANADA.

PORTABLE COLLAPSIBLE COLLECTING CONTRIVANCE.

1,368,697.   Specification of Letters Patent.   Patented Feb. 15, 1921.

Continuation of application Serial No. 109,293, filed July 14, 1916. This application filed December 21, 1917. Serial No. 208,255.

*To all whom it may concern:*

Be it known that I, EGERTON RYERSON CASE, of the city of Toronto, county of York, Province of Ontario, Canada, a subject of the King of Great Britain, have invented a certain new and useful Portable Collapsible Collecting Contrivance, of which the following is a specification.

This invention relates to a certain new and useful portable collapsible collecting contrivance, and one object of the invention is to provide a contrivance of the class described in the form of a manually portable flexible container which can be opened or spread out flat or substantially flat, on the ground or floor, and shifted from place to place so that it can be loaded, and a given area of ground or floor consequently progressively cleaned therewith at a greater saving of time and labor than is now obtainable. Another object of the invention is to provide raking means, when desired, so that as the contrivance is moved over the lawn for example, material will be gathered thereonto by that very act. A still further object of the invention is to provide means that may be used with the preferred and other forms of invention, whereby the contrivance, though it rest on the ground or floor during loading and unloading operations, may be raised thereabove to permit of its ready transportation.

In its broadest conception, the invention is embodied in the form of a manually portable flexible container of the desired configuration of perimeter, and it may be embodied in the various species illustrated and described. Flexible means is provided, and substantially non-obstructively positioned, and used in such a manner as to enable the container to be spread open essentially for loading and unloading purposes, on the ground or floor, and closed after loading to permit of its transportation; the said flexible means, in its preferred forms, folding in with the container to permit the same to be folded to be put away after use, as will be hereinafter more particularly described in respect of certain specific embodiments of the invention.

Figure 1:
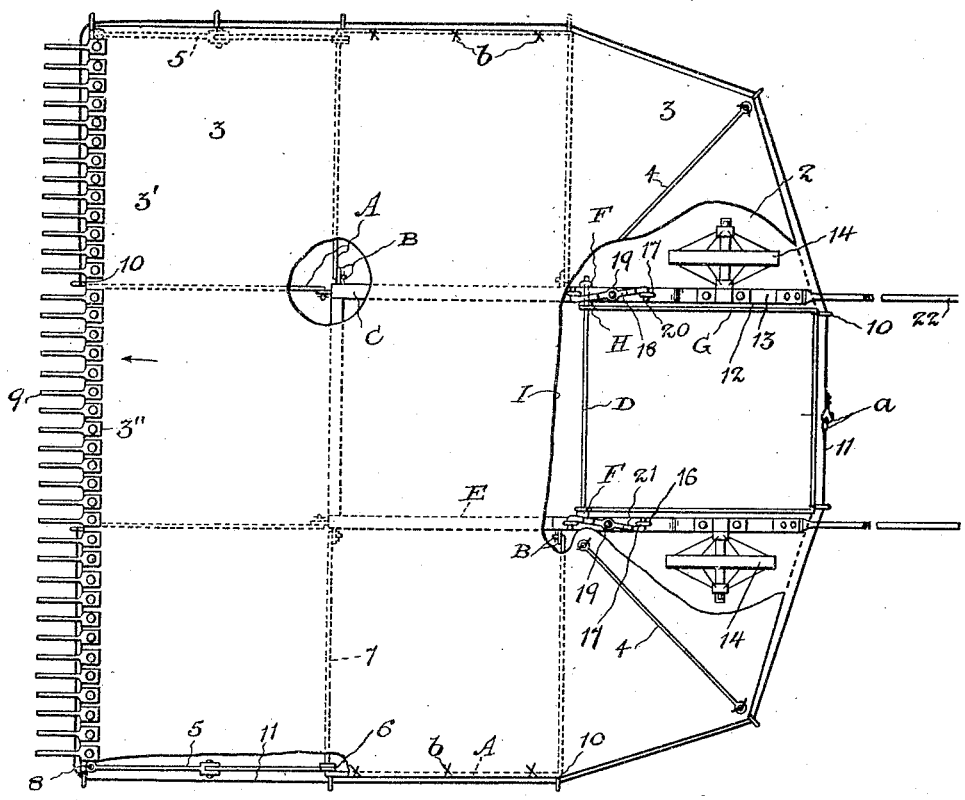
Figure 2:
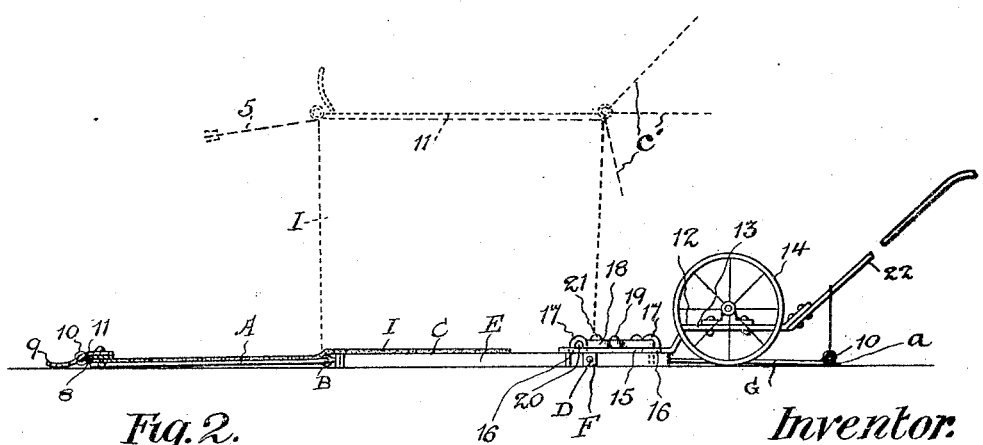
Figures 7, 8:
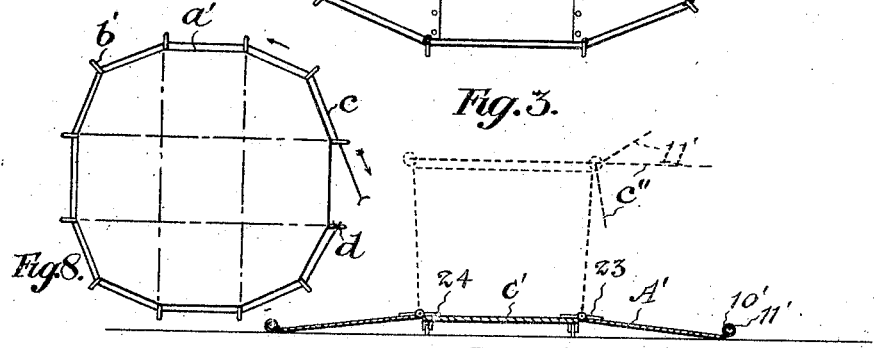

Figure 1 is a plan of a flexible container within my invention, in open or collapsed position, certain parts being broken away to facilitate illustration of preferred construction; Fig. 2, is, in part, a side elevation of the preferred form of contrivance shown in Fig. 1, certain parts being shown in section, and certain parts shown diagrammatically in dotted position. Figs. 3, 4, 5, and 6 are plans of alternative forms of the contrivance opened ready for use, within my invention. Fig. 7 is a horizontal cross section on the line 7—7, Fig. 3; this view shows, in dotted lines, the contrivance closed, and Fig. 8 is a plan of a form of my contrivance in open position, showing an alternative manner of using the flexible member or draw-cord.

In the drawings, like characters of reference refer to the same parts.

This application is a continuation of the invention so far as disclosed in my application Serial Number 109,293, filed July 14, 1916, for improvements in collapsible carriers.

In the preferred form of contrivance, A are any suitable open frames hinged by coupling means B to any suitable frame C. D is a tie-rod, the ends of which are suitably secured in the members E of the frame C. I prefer to thread these ends and place thereon nuts F at each side of each member E so that these parts may be securely held in relationship. G is any suitable frame suitably hinged on the tie-rod D as by means of eyes H. The said frames are covered by any suitable material, and in order to reduce weight, I provide a covering or container I, preferably made of canvas, and the spaces 2 between the various frames A and G are filled in by said covering or container which at these points forms flexible webs or corners 3. The said covering or container I, may be made of netting, so as to allow the wind to largely blow therethrough without causing eddies, and is secured in place by any suitable means such as tapes *b* attached thereto. The configuration of the perimeter will be such as to provide the said contrivance with the maximum capacity. To maintain certain of the flexible webs or corners 3 spread open, the rods 4 may be used, and the same are suitably secured in place.

To maintain the forward webs or corners 3 in open position, jointed thrust-rods 5 are used and their inner ends hinged by any suitable coupling means 6 to the side members 7 of the frames A at the outer portions of these frames. The forward ends of the said thrust rods are suitably flexibly secured to the front or forward edge 8 of the contrivance. Secured to said front or forward edge 8 may be any suitable raking means composed of a plurality of teeth 9 spaced apart and suitably secured to the said covering or container I. The outer sections of said raking means, carried by the forward flexible webs or corners 3', are preferably flexible so as to permit of the closing of the contrivance, as shown diagrammatically by dotted lines in Fig. 2. Secured at suitable points either to the covering or container I, or to the frames A and G, are a plurality of eyes in the form of rings 10 through which is passed a suitable flexible element preferably in the form of a draw-cord 11.

The form of contrivance illustrated in Fig. 1, is designed to be moved or carried by a preferred demountable truck hereinafter described, and in order to rake up material such as grass and leaves, the contrivance will be opened out into the position illustrated in Fig. 1, and moved in the direction indicated by arrow, thus accumulating leaves and grass. The thrust rods 5 are attached to the outer-forward portions of the corners 3', and consequently the outer sections of the raking means are held sufficiently in alinement with the central section 3" to effect the purpose in view.

To close this and certain other forms of the loaded contrivance, one side or end thereof is raised sufficiently to obtain the necessary first leverage. This operation can be effected directly by hand, or by pulling upwardly on the element 11. Once the said first-leverage is secured and maintained, the continued pulling of the element 11 raises the other sides or ends of the contrivance through a progressively available leverage obtainable therethrough until closure is effected.

As closure of the preferred form of contrivance occurs, the thrust-rods 5 will assume approximately the dotted position illustrated in Fig. 2.

It will be observed upon referring to Fig. 2, that the frames of the contrivance rest substantially flat upon the ground or floor for loading and unloading. To permit of this position of the contrivance during the operations mentioned, and yet provide for the raising of the same from off the ground or floor for transportation purposes, I must essentially provide rotatable means having its axis of rotation above the bottom of the contrivance so that the necessary leverage may be secured through utilizing said axis of rotation as a fulcrum. The preferred means used to enable me to secure and utilize the fulcrum mentioned, is in the form of a truck, the preferred construction of which is as follows:

This truck is made of two sections, and the description of one will do for both. 12 is a truck-frame, the upper-plate 13 of which carries the wheel 14. The lower plates 15 of said truck frames rest upon the members E, and are provided with slots 16 (see dotted lines, Fig. 2), through which project eyes 17, carried by said members E. A hook or latch 18 is pivoted by a pin 19 to each plate 15, and to couple said truck frames 12 to the members E, the ends 20 of said hooks or latches enter the eyes 17. Lugs 21 are carried by each of said hooks or latches 18 and one at each side of the pins 19, thus permitting manual manipulation of said hooks or latches in order to couple said truck-frames to the frames C or uncouple them therefrom. Carried by each of the plates 13, is a handle 22. Since the plates 13 occupy a plane above the plates 15, I am enabled to use wheels of the desired diameter, and by using the handles 22 as levers with the axle of each wheel 14 as a fulcrum, it will be understood that the contrivance may be lifted off the ground and readily moved.

The flexible element 11 may pass over the handles 22 and rest on the ground therebetween so as to be out of the way and yet always in position for use. If desired, a demountable coupling device $a$, may be carried by the element 11 to permit this element to be divided or separated, if desired, at the location indicated.

Since the tie-rod D also lies close to the ground, it will be understood that the operator may freely pass between the truck-frames 12 and handles 22 without interference when the contrivance is in open position. This fact is particularly important when my contrivance is made without raking means, as in that case, the user may tread over the contrivance during the operation of raking the leaves or grass thereonto with an ordinary rake.

At no time is the element 11 used to tilt the base or bottom of the contrivance out of the horizontal. During loading and unloading, said base or bottom essentially rests on the ground or floor. To permit of the removal of the load carried by the contrivance, the flexible element 11 is manually freed to release the perimeter of the container to permit the container to be opened by reason of the outward thrust of the load carried thereby, by which movement, said element 11 is drawn back to normal position. Relieved of the pressure of the sides of the container, the load will spread more or less thereover and may be raked or swept therefrom.

The said truck-sections may be removed from the frame C so that the preferred form of contrivance may be packed compactly for shipment or storage.

The flexible element 11 will be held under tension to keep the contrivance closed preferably by gripping it against one of the handles 22.

Figure 3:
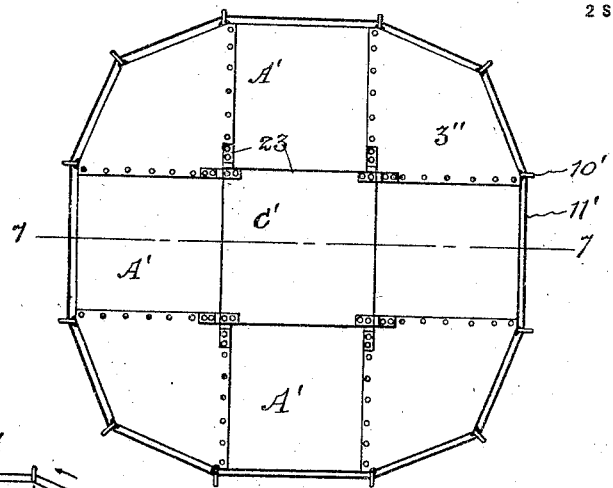

In the species illustrated in Figs. 3 and 7, in place of the open frames illustrated in Fig. 1, I provide a platform C' to the sides of which are flexibly coupled side members A' as by means of hinges 23. The said side members and platform may be made of metal or wood, or any other suitable material, and the spaces therebetween are filled in by flexible webbing 3''', suitably secured to said side members. Mounted at convenient points at the periphery of said contrivance are a plurality of rings 10' or equivalent elements, and passing therethrough is the flexible element 11'.

This form of contrivance is designed to be used on a floor or paved road, and for this purpose it is provided with suitable caster-wheels 24 which are suitably coupled to the platform C'.

Figure 4:
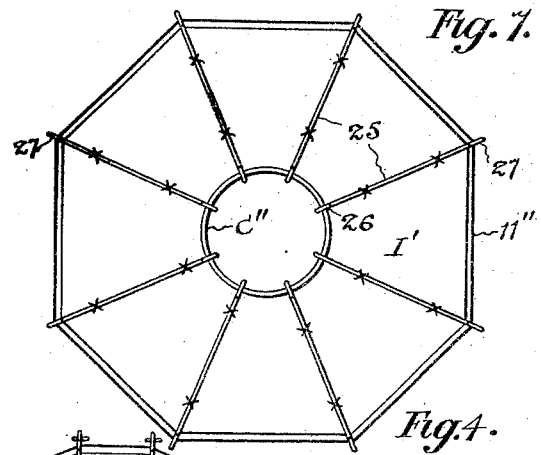

In the species illustrated in Fig. 4, I dispense with the frames A and G, and in place thereof, I use a plurality of ribs 25 which are suitably held in movable relationship in respect of the frame C'' as by means of eyes 26 through which said frame passes. These ribs are radially disposed and are held in the desired spaced relationship by any suitable means as by lacing them to the covering or container I'. 27 are eyes formed at the outer ends of the ribs 25 through which the flexible element or drawcord 11'' passes.

Figure 5:
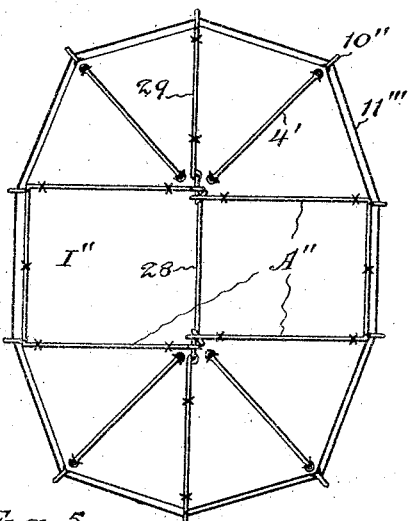

In the species illustrated in Fig. 5, I illustrate a bar or rod 28 with which the frames A'' are held in coöperative relationship. In place of using four open frames in this species, I use only two, and substitute for the remainder, bars or rods 29 suitably held in coöperative relationship with the bar or rod 28 and the frames A''. If desired, I may use the ribs 4' suitably held in position on the covering or container I''. This species is also provided with rings or equivalent elements 10'', at convenient points through which is passed the flexible element 11''.

Figure 6:
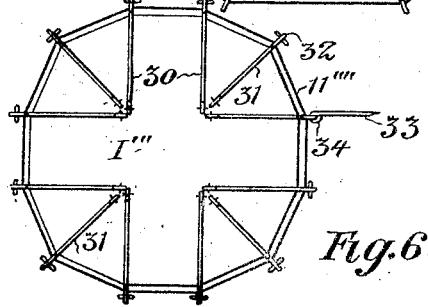

In the species illustrated in Fig. 6, I dispense with any central frame corresponding to the frames before described, and use a frame composed of a plurality of ribs or rods 30, and between each of these ribs or rods is positioned a rib 31. These ribs or rods are suitably secured to the covering or container I''', and are provided at their outer ends with eyes 32 through which is passed the flexible element 11''''.

If care be used in loading this species of the contrivance, it has been found that it is not necessary to use therewith means to maintain it in open position.

In order to keep this species of the contrivance spread open during loading, some suitable means must be used; my preferred means comprises a plurality of pegs 33, each provided with an eye 34 coupled to the eyes 32. As many as desired may be used of these pegs, and the same are shoved into the ground at the most convenient angle to effect the object in view.

I may omit the use of the rods or ribs 30 and 31, illustrated in Fig. 6, since the pegs 33 or equivalent means, carried by the eyes 32 (which eyes will have to be secured to the container in that case) will hold the covering or container I''' from displacement during raking or sweeping operations.

In Fig. 8, I show an alternative manner of utilizing the flexible element. $a'$ is the contrivance, and carried thereby at suitable locations, are a plurality of rings or eyes $b'$ through which is threaded the flexible element $c$. One end of this element is tied to one of the rings $b'$ as shown at $d$, and the other end is free. To close the contrivance with the element mounted as described, the side of the contrivance adjacent the free end of the element $c$ will be raised, and this element pulled in the direction indicated by arrow with tail. The various corners and sides of the apparatus will be closed progressively in the direction of the arrow without tail. This manner of using the flexible element in question is as satisfactory as when using the element in the manner already described in respect of the other views.

In all disclosed forms of the contrivance, the flexible element is used to essentially directly apply power initially at or through one side or end thereof, and that power dominates the whole perimeter of the contrivance, in such manner as to gather the same up circumferentially, as all of the sides or ends thereof must be raised or elevated so as to properly contain the load.

When using the flexible element mounted as shown in Fig. 1, for example, the force exerted by the same is divided, part moving to the right and part moving to the left.

In all disclosed forms of my contrivance, it will be observed that the closing force exerted by the flexible element is initially exerted at the side or end thereof immediately in front of the user who stands on the ground or floor. The power pulling the flexible element as illustrated in Figs. 2 and 7, may be applied above the device; horizontally outward, or downward as shown by dotted lines $c'$ and $c''$.

In all disclosed species of my invention, it will be observed that the sides or ends thereof may be opened out around the whole base or bottom thereof.

In all disclosed forms of my contrivance, the flexible element, during the loading and unloading of the same, occupies a substantially non-obstructive position; and it is evident that strain is manually applied to said element only as and when the contrivance is closed and held closed.

It will be observed that said flexible element folds in with the container to permit the same to be folded up and put away after use. The said element is not necessarily used to transport the contrivance.

My invention in certain species may be used as a collapsible pail or bucket, or as a bath, when the flexible covering or container is made more or less watertight. I also claim that the manner herein set forth of progressively cleaning the ground covered with leaves and grass, is a new method for doing this work, and is very speedy.

While I have described what I consider to be the best embodiments of my invention, I desire it to be understood that the principle can be embodied in still other forms, and I desire not to be limited beyond the requirements of the prior art and the terms of my claims.

Claims.

1. A contrivance of the class described comprising a portable folding flexible container of the required configuration of perimeter designed to be opened out to permit the load to be manually raked thereonto and therefrom; normally-inert manually-operated flexible means associated with said container to manipulate the same to hold the load, and means associated with said container for holding certain portions thereof substantially taut, for the purpose specified.

2. A contrivance of the class described comprising a portable folding flexible container of the required configuration of perimeter designed to be opened out to permit the load to be manually raked thereonto and therefrom; normally-inert manually-operated flexible means, and means associated with said container through which said flexible means freely passes to manipulate the container to hold the load, said last-named means holding portion of said container substantially taut, for the purpose specified.

3. A contrivance of the class described comprising a portable folding flexible container of the required configuration of perimeter designed to be opened out to permit the load to be manually raked thereonto and therefrom; normally-inert manually-operated flexible means; eyes associated with said container through which flexible means freely passes to manipulate the container to hold the load, and means for holding portions of said container substantially taut, for the purpose specified.

4. A contrivance of the class described comprising a portable folding flexible container of the required configuration of perimeter designed to be opened out to permit the load to be manually raked thereonto and therefrom; a plurality of spreading members associated with said container to spread the same when it is opened, and manually-operated flexible means associated with said container and said spreading means to manipulate the container to hold the load, for the purpose specified.

5. A contrivance of the class described comprising a portable folding flexible container of the required configuration of perimeter designed to be opened out to permit the load to be manually raked thereonto and therefrom; a plurality of spreading members associated with said container to spread the same when it is opened; manually-operated flexible means, and eyes associated with said container and said spreading members through which said flexible means freely passes to manipulate the container to hold the load, for the purpose specified.

6. A contrivance of the class described comprising a flexible lining of the required configuration of perimeter designed to be opened out to permit the load to be manually raked thereonto and therefrom; a multi-sectioned collapsible frame associated with said lining, certain sections of the said frame designed to open outwardly around the middle section to spread the lining open, and manually-operated flexible means associated with said lining and said certain sections to manipulate the same to hold the load, for the purpose specified.

7. A contrivance of the class described comprising a flexible lining of the required configuration of perimeter designed to be opened out to permit the load to be manually raked thereonto and therefrom; a frame comprising a base; a plurality of retaining members held in movable relationship in respect of said base and in respect of each other, and manually-operated flexible means associated with said lining and said retaining members to manipulate the same to hold the load, for the purpose specified.

8. A contrivance of the class described comprising a base; a plurality of open frames positioned radially in respect of said base and held in coöperative relationship; a flexible lining covering said base and frames; flexible webs coupling the adjacent sides of said open frame together; manually-operated flexible controlling means for said contrivance, and means associated with said frames and webs through which said flexible means freely passes to manipulate the said lining to retain the load, for the purpose specified.

9. In combination, a contrivance of the class described comprising a portable folding flexible container of the required configuration of perimeter designed to be opened out to permit the load to be manually raked thereonto and therefrom; manually-operated flexible means associated therewith to manipulate the said container to hold the load, and means to permit of the transportation of the loaded contrivance over the ground associated with said contrivance and positioned beneath the same and away from the receiving surface thereof when the container is in open receiving position.

10. In a contrivance of the class described, in combination a portable folding flexible container of the required configuration of perimeter designed to be opened out to permit the load to be manually raked thereonto and therefrom; manually-operated flexible means associated therewith to manipulate the same to hold the load, and flexible raking means carried by the front side of said container, for the purpose specified.

11. In a contrivance of the class described, in combination a portable folding flexible container of the required configuration of perimeter designed to be opened out to permit the load to be manually raked thereonto and therefrom; manually-operated flexible means associated therewith to manipulate the same to hold the load; flexible raking means carried by the front side of said container, and means to permit of the transportation of the loaded contrivance over the ground, associated with said flexible container and positioned beneath the same and away from the receiving surface thereof when the container is in open receiving position.

12. A contrivance of the class described comprising a base made of an open frame; a plurality of open movable frames positioned laterally in respect of said base and held in coöperative relationship; a flexible lining attached to said frames, and filling the space between the adjacent movable frames; ribs supported by said flexible lining between the adjacent parts of said second-mentioned movable frames; manually-operated flexible controlling means for said lining and movable frames, and means associated with said lining and said open frames through which said flexible means freely passes to manipulate the container to hold the load, for the purpose specified.

13. In a contrivance of the class described, in combination a portable folding flexible container of the required configuration of perimeter designed to be opened out to permit the load to be raked thereonto and therefrom; supporting means for said container comprising a base; a plurality of elements flexibly coupled to each side of said base; a pair of jointed thrust rods flexibly coupled one at each side of the contrivance and to certain of said elements; manually-operated flexible means associated with said container and said elements to manipulate the container to hold the load, and flexible raking means carried by the front side of said container and supported at each end by said jointed thrust rods, as set forth.

14. A contrivance of the class described comprising a plurality of elements flexibly associated with a middle base; flexible webs coupling the adjacent sides of said elements together, the whole unitedly constituting a flexible container having a receiving floor when opened out to permit the load to be manually raked thereonto and therefrom, and manually-operated normally-inert flexible means associated with the perimeter of said container to gather parts of said receiving floor formed by said elements and webs upwardly and inwardly around said base to form a retaining wall to retain the load during transportation.

15. In a contrivance of the class described, in combination a plurality of elements flexibly associated with a middle base; flexible webs coupling the adjacent sides of said elements together, the whole unitedly constituting a flexible container having a receiving floor when opened out to permit the load to be manually raked thereonto and therefrom; a pair of jointed thrust rods flexibly coupled one at each side of the contrivance; flexible raking means carried by the front side of the said contrivance, and supported at each end by said jointed thrust rods, and manually-operated flexible means associated with said container to manipulate the same to hold the load, as set forth.

16. In a contrivance of the class described, in combination a plurality of elements flexibly associated with a middle base; flexible webs coupling the adjacent sides of said elements together, the whole unitedly constituting a flexible container having a receiving floor when opened out to permit the load to be manually raked thereonto and therefrom; manually-operated flexible means associated with said container and said webs to manipulate the same upwardly and inwardly around said base to contain the load during transportation, and means to permit of the transportation of the loaded contrivance over the ground associated with said container and positioned beneath the same and away from the receiving surface thereof when the container is in open receiving position.

17. The method of progressively cleaning ground covered with leaves or grass which consists in spreading a flexible rake-provided container on the ground; then by the very act of moving the container over the ground to pass the rake underneath the leaves or grass to load the same, and then manually manipulating the loaded container to retain the load by causing all of the outer edges of the container to be moved upwardly and inwardly during a single operation.

EGERTON RYERSON CASE.